(12) United States Patent
Chen et al.

(10) Patent No.: US 7,499,596 B2
(45) Date of Patent: Mar. 3, 2009

(54) AMPLITUDE CODING FOR CLUSTERED TRANSFORM COEFFICIENTS

(75) Inventors: Wen-hsiung Chen, Sunnyvale, CA (US); Fang Wu, Pleasanton, CA (US); Gregory D. Pelton, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 752 days.

(21) Appl. No.: 11/069,622

(22) Filed: Feb. 28, 2005

(65) Prior Publication Data

US 2006/0039616 A1 Feb. 23, 2006

Related U.S. Application Data

(63) Continuation-in-part of application No. 10/922,508, filed on Aug. 18, 2004.

(51) Int. Cl.
*G06K 9/36* (2006.01)
(52) U.S. Cl. ..................................................... 382/245
(58) Field of Classification Search ................. 382/245
See application file for complete search history.

(56) References Cited

U.S. PATENT DOCUMENTS

| | | | | |
|---|---|---|---|---|
| 4,420,771 A | * | 12/1983 | Pirsch | 341/56 |
| 4,698,672 A | | 10/1987 | Chen et al. | 358/136 |
| 4,706,265 A | | 11/1987 | Furukawa | 375/122 |
| 4,725,815 A | * | 2/1988 | Mitchell et al. | 341/67 |
| 4,813,056 A | | 3/1989 | Fedele | 375/27 |
| 4,821,119 A | | 4/1989 | Gharavi | 375/240.16 |
| 4,845,560 A | | 7/1989 | Kondo et al. | 358/133 |
| 4,858,017 A | | 8/1989 | Torbey | 358/426 |
| 4,920,426 A | | 4/1990 | Hatori et al. | 358/433 |

(Continued)

FOREIGN PATENT DOCUMENTS

EP  0 266 049 A2  5/1988

(Continued)

OTHER PUBLICATIONS

G. Cote, B. Erol, M. Gallant, & F. Kossentini, "H.263+: Video Coding at Low Bit Rates" in *IEEE Transactions on Circuits and Systems for Video Technology*, vol. 8, No. 7, Nov. 1998.

(Continued)

*Primary Examiner*—Wenpeng Chen
(74) *Attorney, Agent, or Firm*—Dov Rosenfeld; Inventek

(57) ABSTRACT

A method, apparatus, and a computer readable hardware storage medium with instructions to encode a series of quantized transform coefficients. The method includes identifying runs of one or more non-zero coefficients, and for each such run, identifying events of consecutive amplitude-1 coefficients followed by a single amplitude>1 coefficient. The method further includes encoding the identified event with a codeword, each event identified according to the length of the consecutive amplitude-1 coefficients and the amplitude of the ending coefficient. The method is such that relatively short codewords are formed to represent values or sequences of values that are relatively more likely-to-occur, and relatively long codewords are formed to represent values or sequences of values that are relatively less likely-to-occur. The method is applicable to encoding a region in the series where there is likely to be a cluster of non-zero-valued coefficients.

23 Claims, 7 Drawing Sheets

U.S. PATENT DOCUMENTS

| | | | |
|---|---|---|---|
| 4,922,510 A | 5/1990 | Brusewitz | 375/122 |
| 4,937,573 A | 6/1990 | Silvio et al. | 341/67 |
| 4,985,700 A | 1/1991 | Mikami | 341/59 |
| 4,985,766 A | 1/1991 | Morrison et al. | 358/133 |
| 5,006,930 A | 4/1991 | Stroppiana et al. | 358/133 |
| 5,045,938 A | 9/1991 | Sugiyama | 358/133 |
| 5,062,152 A | 10/1991 | Faulkner | 359/185 |
| 5,086,488 A | 2/1992 | Kato et al. | 382/56 |
| 5,128,758 A | 7/1992 | Azadegan et al. | 358/133 |
| 5,136,376 A | 8/1992 | Yagasaki et al. | 358/133 |
| 5,162,795 A | 11/1992 | Shirota | 341/67 |
| 5,166,684 A | 11/1992 | Juri et al. | 341/67 |
| 5,179,442 A | 1/1993 | Azadegan et al. | 358/133 |
| 5,226,082 A | 7/1993 | Kustka | 380/46 |
| 5,253,053 A | 10/1993 | Chu et al. | 358/133 |
| 5,253,055 A | 10/1993 | Civanlar et al. | 358/133 |
| 5,253,058 A * | 10/1993 | Gharavi | 375/240.12 |
| 5,291,282 A | 3/1994 | Nakagawa et al. | 348/384 |
| 5,298,991 A | 3/1994 | Yagasaki et al. | 348/416 |
| 5,301,032 A | 4/1994 | Hong et al. | 358/261.2 |
| 5,307,163 A | 4/1994 | Hatano et al. | 348/415 |
| 5,319,457 A | 6/1994 | Nakahashi et al. | 348/387 |
| 5,337,087 A | 8/1994 | Mishima | 348/405 |
| 5,363,097 A | 11/1994 | Jan | 341/67 |
| 5,371,811 A | 12/1994 | Morrison et al. | 382/56 |
| 5,400,075 A | 3/1995 | Savatier | 348/384 |
| 5,402,244 A | 3/1995 | Kim | 358/261.2 |
| 5,446,744 A | 8/1995 | Nagasawa et al. | 371/37.4 |
| RE35,093 E | 11/1995 | Wang et al. | 348/413 |
| 5,475,501 A | 12/1995 | Yagasaki | 358/426 |
| 5,479,527 A | 12/1995 | Chen | 382/232 |
| 5,488,367 A | 1/1996 | Kitamura | 341/106 |
| 5,488,418 A | 1/1996 | Mishima et al. | 348/398 |
| 5,488,616 A | 1/1996 | Takishima et al. | 371/30 |
| 5,491,480 A | 2/1996 | Jan et al. | 341/67 |
| 5,528,628 A | 6/1996 | Park et al. | 375/240 |
| 5,539,401 A | 7/1996 | Kumaki et al. | 341/67 |
| 5,640,420 A | 6/1997 | Jung | 375/240 |
| 5,642,115 A | 6/1997 | Chen | 341/67 |
| 5,644,305 A | 7/1997 | Inoue et al. | 341/67 |
| 5,648,774 A | 7/1997 | Hsieh | 341/67 |
| 5,650,782 A | 7/1997 | Kim | 341/67 |
| 5,696,558 A | 12/1997 | Tsukamoto | 348/405 |
| 5,717,394 A | 2/1998 | Schwartz et al. | 341/51 |
| 5,731,836 A | 3/1998 | Lee | 348/402 |
| 5,740,283 A | 4/1998 | Meeker | 382/248 |
| 5,742,342 A * | 4/1998 | Jung | 375/240.03 |
| 5,751,232 A | 5/1998 | Inoue et al. | 341/67 |
| 5,767,800 A | 6/1998 | Machida et al. | 341/67 |
| 5,767,908 A | 6/1998 | Choi | 348/403 |
| 5,774,594 A | 6/1998 | Kitamura | 382/239 |
| 5,793,432 A | 8/1998 | Mishima et al. | 348/423 |
| 5,793,897 A | 8/1998 | Jo et al. | 382/246 |
| 5,818,877 A | 10/1998 | Tsai et al. | 375/241 |
| 5,822,463 A | 10/1998 | Yokose et al. | 382/251 |
| 5,832,130 A | 11/1998 | Kim | 382/248 |
| 5,844,611 A | 12/1998 | Hamano et al. | 348/403 |
| 5,852,469 A | 12/1998 | Nagai et al. | 348/384 |
| 5,883,589 A | 3/1999 | Takishima et al. | 341/67 |
| 5,923,813 A | 7/1999 | Okamoto et al. | 386/109 |
| 5,956,153 A | 9/1999 | Hirabayashi | 358/433 |
| 5,982,437 A | 11/1999 | Okazaki et al. | 348/413 |
| 5,999,111 A | 12/1999 | Park et al. | 341/67 |
| 6,014,095 A | 1/2000 | Yokoyama | 341/67 |
| 6,104,754 A | 8/2000 | Chujoh et al. | 375/240 |
| 6,111,914 A | 8/2000 | Bist | 375/240 |
| 6,118,822 A | 9/2000 | Bist | 375/240 |
| 6,140,944 A | 10/2000 | Toyoyama | 341/63 |
| 6,144,322 A | 11/2000 | Sato | 341/67 |
| 6,198,848 B1 | 3/2001 | Honma et al. | 382/232 |
| 6,215,424 B1 * | 4/2001 | Cooper | 341/67 |
| 6,218,968 B1 | 4/2001 | Smeets et al. | 341/65 |
| 6,229,460 B1 | 5/2001 | Tsai et al. | 341/67 |
| 6,256,064 B1 | 7/2001 | Chujoh et al. | 348/240.23 |
| 6,278,801 B1 | 8/2001 | Boon | 382/246 |
| 6,304,607 B1 | 10/2001 | Talluri et al. | 375/240.27 |
| 6,339,386 B1 | 1/2002 | Cho | 341/67 |
| 6,388,588 B2 | 5/2002 | Kitamura | 341/67 |
| 6,404,929 B1 | 6/2002 | Boon | 382/233 |
| 6,408,029 B1 | 6/2002 | McVeigh et al. | 375/240.13 |
| 6,445,314 B1 | 9/2002 | Zhang et al. | 341/67 |
| 6,445,739 B1 | 9/2002 | Shen et al. | 375/240.03 |
| 6,477,280 B1 | 11/2002 | Malvar | 382/245 |
| 6,771,828 B1 | 8/2004 | Malvar | 382/240 |
| 2004/0228540 A1 | 11/2004 | Chen et al. | 382/246 |

FOREIGN PATENT DOCUMENTS

| | | |
|---|---|---|
| WO | WO 93/18616 | 9/1993 |
| WO | WO 03/090421 | 10/2003 |

OTHER PUBLICATIONS

T. Chujoh & Y. Kikuchi, "An improved variable length coding", *Joint Video Team (JVT) of ISO/IEC MPEG &ITU-T VCEG*, 2nd Meeting: Geneva, CH, Jan. 29-Feb. 1, 2002.

M. Luttrell, J. Wen, H. Yao, and J. Villasen: "Robust Low Bit Rate Wireless Video Communications," Final Report, Project 97-193, University of California MICRO project, available on http://www.ucop.edu/research/micro/97_98/97_193.pdf.

P.N. Tudor, "MPEG-2 Video Compression", IEE J Langham Thompson Prize,*Electronics & Communication Engineering Journal*, Dec. 1995. Available on http://www.bbc.co.uk/rd/pubs/papers/paper_14/paper_14.html.

"H.264/MPEG-4 AVC Video Compression Tutorial", *VideoLocus*, 2002, available on http://www.videolocus.com.

"MPEG-1 Video Codec", pp. 1-8, available on http://www.cmlab.csie.ntu.edu.tw/cml/dsp/training/coding/mpeg1.

K. Takagi, "Reversiblity of Code", *Joint Video Team (JVT) ISO/IEC MPEG & ITU-T VCEG*, 2nd Meeting: Geneva, CH, Jan. 29-Feb. 1, 2002.

A. Bist, "An Adaptive Quantization Scheme for H.263++", ITU-Telecommunication Standardization Sector q15a49, Working Party 15/1, Expert's Group on Very Low Bitrate Visual Telephony, Portland, Jun. 24-27, 1997.

Reed, E.C. and Lim, J.S. "Efficient Coding of DCT Coefficients by Joint Position-Dependent Encoding." *Proceedings of the 1998 IEEE International Conference on Acoustics, Speech and Signal Processing*, May 12, 1998, pp. 2817-2820, IEEE, New York, NY.

Cheung, K.M. and Kiely, A. "An Efficient Variable Length Coding Scheme for an IID Source." *Proceedings of the Data Compression Conference*, Mar. 28, 1995, pp. 182-191, IEEE Computer Society Press, Los Alamitos, CA.

Simon, S. and De Vriendt, J. "Progressive Image Transmission with Run-Length Coding." *Journal on Communications*, vol. 45, May 1994, pp. 45-50, Budapest, Hungary.

Jeon, B., Park, J. and Jeong, J. "Huffman Coding of DCT Coefficients Using Dynamic Codeword Assignment and Adaptive Codebook Selection." *Signal Processing Image Communication*, , vol. 12, No. 3, Jun. 1, 1998, pp. 253-262, Elsevier Science Publishers, Amsterdam, NL.

Chandra, A. and Chakrabarty, K. "Reduction of SOC Test Data Volume, Scan Power and Testing Time Using Alternating Run-length Codes." *Proceedings of the 39th Design Automation Conference*, Jun. 10, 2002, pp. 673-678, ACM, New York, NY.

Taubman, D.S. "Section 2. 4. 3: Run-Length Coding." *JPEG2000: Image Compression Fundamentals, Standards, and Practice*, 2002, Kluwer Academic Publishers, Dordrecht, NL.

Golomb, S. "Run-Length Encodings." *IEEE Transactions on Information Theory*, vol. 12, No. 3, Jul. 1966, pp. 399-401.

Gallager, R.G. and Van Voorhis, D.C. "Optimal Source Codes for Geometrically Distributed Integer Alphabets." *IEEE Transactions on Information Theory*, vol. IT-21, No. 2, Mar. 1975, pp. 228-230.

* cited by examiner

|  | Coefficient values at the end of the run | | | | | | |
|---|---|---|---|---|---|---|---|
|  | 2 | 3 | 4 | 5 | 6 | . | . |
| 0 | $P_n(0,2)$ | $P_n(0,3)$ | $P_n(0,4)$ | $P_n(0,5)$ | $P_n(0,6)$ | . | . |
| 1 | $P_n(1,2)$ | $P_n(1,3)$ | $P_n(1,4)$ | $P_n(1,5)$ | $P_n(1,6)$ | . | . |
| 2 | $P_n(2,2)$ | $P_n(2,3)$ | $P_n(2,4)$ | $P_n(2,5)$ | $P_n(2,6)$ | . | . |
| . | . | . | . | . | . | . | . |
| . | . | . | . | . | . | . | . |
| . | . | . | . | . | . | . | . |
| n−1 | $P_n(n-1,2)$ | $P_n(n-1,3)$ | $P_n(n-1,4)$ | $P_n(n-1,5)$ | $P_n(n-1,6)$ | . | . |
| Exc | $P_n(Exc)$ | | | | | | |

(Row labels on left axis: Runlength of amplitude 1)

FIG. 3

|  |  | Coefficient values at the end of the run | | | | | | |
|---|---|---|---|---|---|---|---|---|
|  |  | 2 | 3 | 4 | 5 | 6 | . | . |
| Runlength of amplitude 1 | 0 | $C_n(0,2)$ | $C_n(0,3)$ | $C_n(0,4)$ | $C_n(0,5)$ | $C_n(0,6)$ | . | . |
| | 1 | $C_n(1,2)$ | $C_n(1,3)$ | $C_n(1,4)$ | $C_n(1,5)$ | $C_n(1,6)$ | . | . |
| | 2 | $C_n(2,2)$ | $C_n(2,3)$ | $C_n(2,4)$ | $C_n(2,5)$ | $C_n(2,6)$ | . | . |
| | . | . | . | . | . | . | . | . |
| | . | . | . | . | . | . | . | . |
| | . | . | . | . | . | . | . | . |
| | n−1 | $C_n(n-1,2)$ | $C_n(n-1,3)$ | $C_n(n-1,4)$ | $C_n(n-1,5)$ | $C_n(n-1,6)$ | . | . |
| | Exc | $C_n$ (Exc) | | | | | | |

AMPLITUDE CODING FOR CLUSTERED TRANSFORM COEFFICIENTS

RELATED APPLICATIONS

The present invention is a continuation-in-part of U.S. patent application Ser. No. 10/922,508 to Toebes, et al., filed Aug. 18, 2004, titled "TWO-DIMENSIONAL VARIABLE LENGTH CODING OF RUNS OF ZERO AND NON-ZERO TRANSFORM COEFFICIENTS FOR IMAGE COMPRESSION," and, and assigned to the assignee of the present invention. The contents of U.S. patent application Ser. No. 10/922,508 are incorporated herein by reference, except any material incorporated by reference in U.S. patent application Ser. No. 10/922,508 and not explicitly incorporated by reference in the present disclosure. The methods described in the incorporated by reference parts of U.S. patent application Ser. No. 10/922,508 are each and collectively referred to as the "2-D Non-Zero/Zero Cluster Coding Method" herein.

The present invention and U.S. patent application Ser. No.10/922,508 are related to U.S. patent application Ser. No. 10/922,507 to inventors Chen, et al., filed Aug. 18, 2004, titled "VIDEO CODING USING MULTI-DIMENSIONAL AMPLITUDE CODING AND 2-D NON-ZERO/ZERO CLUSTER POSITION CODING,". The contents of U.S. patent application Ser. No. 10/922,507 are incorporated herein by reference, except any material incorporated by reference in U.S. patent application Ser. No. 10/922,507 and not explicitly incorporated by reference in the present disclosure. The methods described in the incorporated by reference parts of U.S. patent application Ser. No. 10/922,507 are each and collectively referred to as the Basic Multi-Dimensional Amplitude Coding Method herein.

BACKGROUND

The present invention is related to video coding, in particular to variable length coding of an ordered series of quantized transform coefficients of a transform of a block of image data, and in particular to amplitude coding for clustered transform coefficients which uses two-dimensional position coding of non-zero-valued and zero-valued coefficient clusters.

Two-dimensional variable length coding, referred to as 2D-VLC, has been widely used to code quantized transform coefficients. In traditional 2D-VLC, statistics are collected or assumed of events that include a run of consecutive zero-valued coefficients followed by a single non-zero amplitude coefficient that follows the run length. The ordering of the series of quantized transform coefficients is along a pre-selected path, e.g., a zig-zag path, in the two-dimensional path of the transform. Thus, in a typical implementation, a two-dimensional table consisting of the ending amplitude and the run-length of the preceding consecutive zero-valued coefficients is constructed and variable length codes, such as optimal Huffman codes or arithmetic codes, are assigned according to the assumed or measured statistics to form the 2D-VLC table for the subsequent encoding process. Shorter code lengths are used for the more likely-to-occur, e.g., more frequently occurring events.

2D-VLC is used in common transform coding methods, such as JPEG, MPEG1, MPEG2, ITU-T-261, etc., as follows. For motion video, an image is divided into blocks, e.g., 8 by 8 or 16 by 16 blocks. Each image is classified as interframe or intraframe. Interframe images are typically post motion compensation. The blocks of the image are transformed and the transform coefficients are quantized. The quantized transform coefficients are then coded along a specified path according to a 2D-VLC table. Interframe and intraframe images typically have different 2D-VLC tables. The DC component is typically separately encoded. Furthermore, the 2D-VLC table may be truncated so that the least frequently occurring events use an escape code followed by a fixed length code. A special "EOB" code is used to indicate the end of the block when all remaining coefficients are zero.

One advantage of traditional 2D-VLC is that the position of each non-zero-valued quantized coefficient and its amplitude are coded simultaneously, which generally result in shorter code lengths than using a separate code, e.g., a VLC code for each non-zero-valued coefficient and coefficient amplitude.

Because of the widespread use of image coding, many patents have been issued on different forms of VLC. U.S. Pat. No. 4,698,672 issued Oct. 6, 1987 to Wen-hsiung Chen, one of the inventors of the present invention, for example, described one form of a two-dimensional variable length coding method.

One deficiency of 2D-VLC is that every non-zero-valued coefficient needs to be accompanied by a runlength code to identify its position, in the form of the number of preceding zero-valued coefficients.

In block based transform coding, there often is a region, e.g., a low-frequency region along the ordering in which non-zero-valued coefficients tend to cluster, i.e., there are often a number of consecutive non-zero-valued coefficients along the low frequency region of the pre-determined path. Each one of a number of such consecutive non-zero-valued coefficients would require the same number of codewords representing the position and amplitude.

U.S. patent application Ser. No. 10/342,537 to inventors Chen et al., filed Jan. 15, 2003 and titled AN EXTENSION OF TWO-DIMENSIONAL VARIABLE LENGTH CODING FOR IMAGE COMPRESSION describes a method called the "Extended 2D-VLC Method" herein that includes encoding repetitions of some non-zero coefficient values. One variant of the Extended 2D-VLC method provides codes for all the possible amplitude variations of consecutive coefficients that follow a set of zero-valued coefficients. This effectively reduced the runlength to 1 for all cases. The difficulty of this approach is that there are enormous numbers of patterns that can be generated from the amplitudes of consecutive coefficients. For example, with 32 quantization levels as defined in many common video coding standards, there are in the order of $32^n$ patterns that can be generated from n consecutive coefficients. As such, in a practical implementation, only a limited number of the most likely-to-occur non-zero amplitude values, such as 1 and 2, and a limited number of lengths of consecutive non-zero-values, such as 3 or 4 consecutive values, are regrouped for pattern matching.

Furthermore, in coding, while there may be a region where there are clusters of non-zero-valued coefficients, there is also likely to be a high frequency region where any non-zero-valued coefficients are likely to be scattered.

With this observation in mind, U.S. patent application Ser. No. 10/869,229 to inventors Chen et al., filed Jun. 15, 2004 and titled A HYBRID VARIABLE LENGTH CODING METHOD FOR LOW BIT RATE VIDEO CODING, was developed to encode the position and amplitude of quantized transform coefficients separately and takes advantage of the nature of the distribution of the transform coefficients in the low frequency and high frequency regions. The contents of U.S. patent application Ser. No. 10/869,229 are incorporated herein by reference, except any material incorporated by reference in U.S. patent application Ser. No. 10/869,229 and not explicitly incorporated by reference in the present disclosure. The methods described in the incorporated by reference parts of U.S. patent application Ser. No. 10/869,229 are each and collectively called the "Basic Hybrid VLC Method" herein.

U.S. patent application Ser. No. 10/898,654 to inventors Chen et al., filed Jul. 22, 2004 and titled AN EXTENDED HYBRID VARIABLE LENGTH CODING METHOD FOR LOW BIT RATE VIDEO CODING, was invented, and provides an alternative coding method for the high frequency region by taking advantage of the very few amplitude values in the high frequency region, especially, for example, for low bit rate and interframe applications. The contents of U.S. patent application Ser. No. 10/898,654 are incorporated herein by reference, except any material incorporated by reference in U.S. patent application Ser. No. 10/898,654 and not explicitly incorporated by reference in the present disclosure. The methods described in the incorporated by reference parts of U.S. patent application Ser. No. 10/898,654 are each and collectively called the "Extended Hybrid VLC Method" herein.

In one embodiment of the above-mentioned Basic Hybrid VLC Method, two independent types of coding schemes are introduced to code the quantized coefficients along the path. A boundary is established along the path to define two regions, e.g., a low frequency region and a high frequency region. The boundary can be made adaptive to the video depending on a number of factors such as intraframe coding or interframe coding, standard definition television (SDTV) or high definition television (HDTV), complex scene or simple scene, high bit rate coding or low bit rate coding, and so forth. In one embodiment, the encoding of the quantized coefficients in the low-frequency region includes coding the positions of consecutive non-zero-valued coefficients and the positions of consecutive zero-valued coefficients using a run-length coding method of a first type and a run-length coding method of a second type. The encoding further includes coding the amplitude values and sign of the non-zero-valued coefficients. In the high-frequency region, in one embodiment, the encoding of coefficients in the high frequency region includes encoding the positions of either no consecutive zero-valued coefficients or runs of one or more consecutive zero-valued coefficients using a run-length coding method of a third type. The encoding further includes coding the amplitude values and sign of the non-zero-valued coefficients.

In one embodiment of the above-mentioned Extended Hybrid VLC Method, a coding method is used in the second region that takes into account that almost all non-zero-valued coefficients in the high frequency region are ±1. No amplitude coding is needed to encode runs of consecutive zeroes that end in a coefficient of amplitude 1. An exception (escape) code is included to encode those rare non-zero-valued coefficients that have values other than ±1.

In the Basic Hybrid VLC Method and the Extended Hybrid VLC Method, the consecutive non-zero-valued coefficients and the consecutive zero-valued coefficients in the low frequency region are coded alternatively using two independent one-dimensional variable length coding methods, e.g., using two independent one-dimensional VLC tables. An observation was made that an improvement in coding efficiency can further be achieved by pairing the consecutive non-zero-valued coefficients and zero-valued coefficients as a pair and applying a single two-dimensional table to code the pair. With this observation, the 2-D Non-Zero/Zero Cluster Coding Method of the incorporated by reference parts of above-mentioned U.S. patent application Ser. No. 10/922,508 was introduced to improve the coding efficiency, for example for the low frequency region, and in other embodiments for more than the low frequency region.

In one embodiment of the 2-D Non-Zero/Zero Cluster Coding Method, a method includes, in a first contiguous region, identifying events that each include a run of zero-valued coefficients preceding a run of one or more non-zero-valued coefficients. The method includes for each such event, jointly encoding the run lengths of the preceding run of zero-valued coefficients and the following run of non-zero-valued coefficients with a codeword, such that for at least some events, relatively more likely-to-occur pairs of runlengths are encoded by a shorter codeword than relatively less likely-to-occur runlengths. The method further includes encoding each amplitude in the run of consecutive non-zero-valued coefficients, and encoding the signs of such coefficients. In an improved variation, each event includes a single zero-valued coefficient following the run of non-zero-valued coefficients.

In each of the 2-D Non-Zero/Zero Cluster Coding Method, the Basic Hybrid VLC Method, and the Extended Hybrid VLC Method, various variable length coding methods are introduced to encode the relative positions of the clustered or non-clustered transform coefficients. After each such encoding, a coding of the magnitude of each non-zero valued coefficient is included, as is a sign bit (+ or −).

The inventors have noticed that encoding the amplitudes takes up a significant part of the code in VLC coding of clusters of non-zero-valued coefficients.

The inventors observed that, at least in theory, an improvement in amplitude code can be achieved by introducing a single multi-dimensional code, say an n-dimensional code, n an integer greater than 1, to encode n clustered non-zero coefficients, instead of using n separate one dimensional codes. The Basic Multi-Dimensional Amplitude Coding Method of the incorporated by reference parts of above-mentioned U.S. patent application Ser. No. 10/922,507 includes such multidimensional amplitude coding.

One embodiment of the Basic Multi-Dimensional Amplitude Coding Method includes, in a first region, identifying events that each includes a run of one or more non-zero-valued coefficients, and for each such event, encoding the event with a codeword such that for at least some events, relatively more likely-to-occur events are encoded by a shorter codeword than relatively less likely-to-occur events, and for each identified event, jointly encoding a plurality of consecutive values in the run of consecutive non-zero-valued coefficients, the joint encoding according to an amplitude coding method. The method is such that relatively short codewords are formed to represent values or sequences of values that are relatively more likely-to-occur, and relatively long codewords are formed to represent values or sequences of values that are relatively less likely-to-occur. The method is applicable to encoding a region in the series where there is likely to be a cluster of non-zero-valued coefficients.

While the Basic Multi-Dimensional Amplitude Coding Method invention described in U.S. patent application Ser. No. 10/922,507 appears to improve the overall coding efficiency, it was observed that the size of the n-dimensional table used for the joint encoding can become rather large for a large "n." As a result, in practice, the size of n has to be limited to a low number of consecutive non-zero-amplitude values, such as 1, 2 and 3 for practical implementation.

Thus there still is a need in the art for a relatively efficient method of encoding clusters of amplitudes applicable to variable length coding.

SUMMARY

A Method, apparatus, and carrier medium to process an ordered series of digital signals that each have an amplitude from a finite set of amplitudes consisting of the most likely-to-occur amplitude and at least one other amplitude. The at least one other amplitude includes a next most likely-to-occur amplitude to the most likely-to-occur amplitude. The processing is to reduce the amount of data used to represent the digital signals and to form codewords such that the relatively more likely-to-occur values or sequences of values of digital signals are represented by relatively short codewords and the relatively less likely-to-occur values or sequences of values of digital signals are represented by relatively long codewords.

In one embodiment described, the ordered series of digital signals is a series of quantized coefficients of a transformed block of image data. The transform is such that the most likely-to-occur amplitude is 0, and the next most likely-to-occur amplitude is 1.

The method includes, for a first contiguous region in the series, identifying runs that each includes one or more consecutive coefficients having any non-zero amplitude. For each identified run, the method includes encoding the relative positions of the runs, and of any intervening consecutive zero-valued coefficients, and further, for each identified run, identifying events of at least one consecutive coefficient, an identified event including a sequence of at least one consecutive amplitude-1 coefficient ending in a coefficient of amplitude greater than 1, or including only a coefficient of amplitude greater than 1, or including of only a sequence of consecutive amplitude-1 coefficients. Each identified event for the runlength of the identified run is defined by the length of the sequence of at least one consecutive amplitude-1 coefficients, and by the amplitude of the ending coefficient. The method further includes encoding each identified event by at least one codeword such that for at least some identified events, relatively more likely-to-occur events are encoded by a shorter codeword than relatively less likely-to-occur events. Thus, relatively short codewords are formed to represent coefficient values or sequences of coefficient values that are relatively more likely-to-occur, and relatively long codewords are formed to represent coefficient values or sequences of coefficient values that are relatively less likely-to-occur.

The coding method described herein is expected to be simpler to implement than the Basic Multi-Dimensional Amplitude Coding Method described in the above-mentioned incorporated-by-reference U.S. patent application Ser. No. 10/922,507, with comparable or better coding efficiency.

BRIEF DESCRIPTION OF THE DRAWINGS

FIG. 3 shows a table of relative likelihoods of occurrences for runs of 1's within a run of a number, denoted n, of n non-zero amplitude coefficients.

FIG. 4 shows a code table for events of runs of 1 ending on an amplitude greater than 1 in a consecutive run of a number, n of consecutive non-zero amplitude coefficients.

DETAILED DESCRIPTION

An aspect of the present invention introduces a set of VLC methods to code multiple consecutive non-zero-valued coefficients that occur in runs of non-zero-valued coefficients ("clusters") in coding an ordered series of quantized coefficients of a transform of image data, as occurs in many image compression methods.

While the description is written in terms of an ordered series of digital values that are quantized transform coefficients of a block of image data, with zero-valued quantized coefficients being the most likely-to-occur, and quantized coefficients of value ±1 being the next likely-to-occur values, the invention is, in general, applicable to an ordered series of digital signals that each have an amplitude from a finite set of amplitudes consisting of the most likely-to-occur amplitude and at least one other amplitude.

Figure 1:
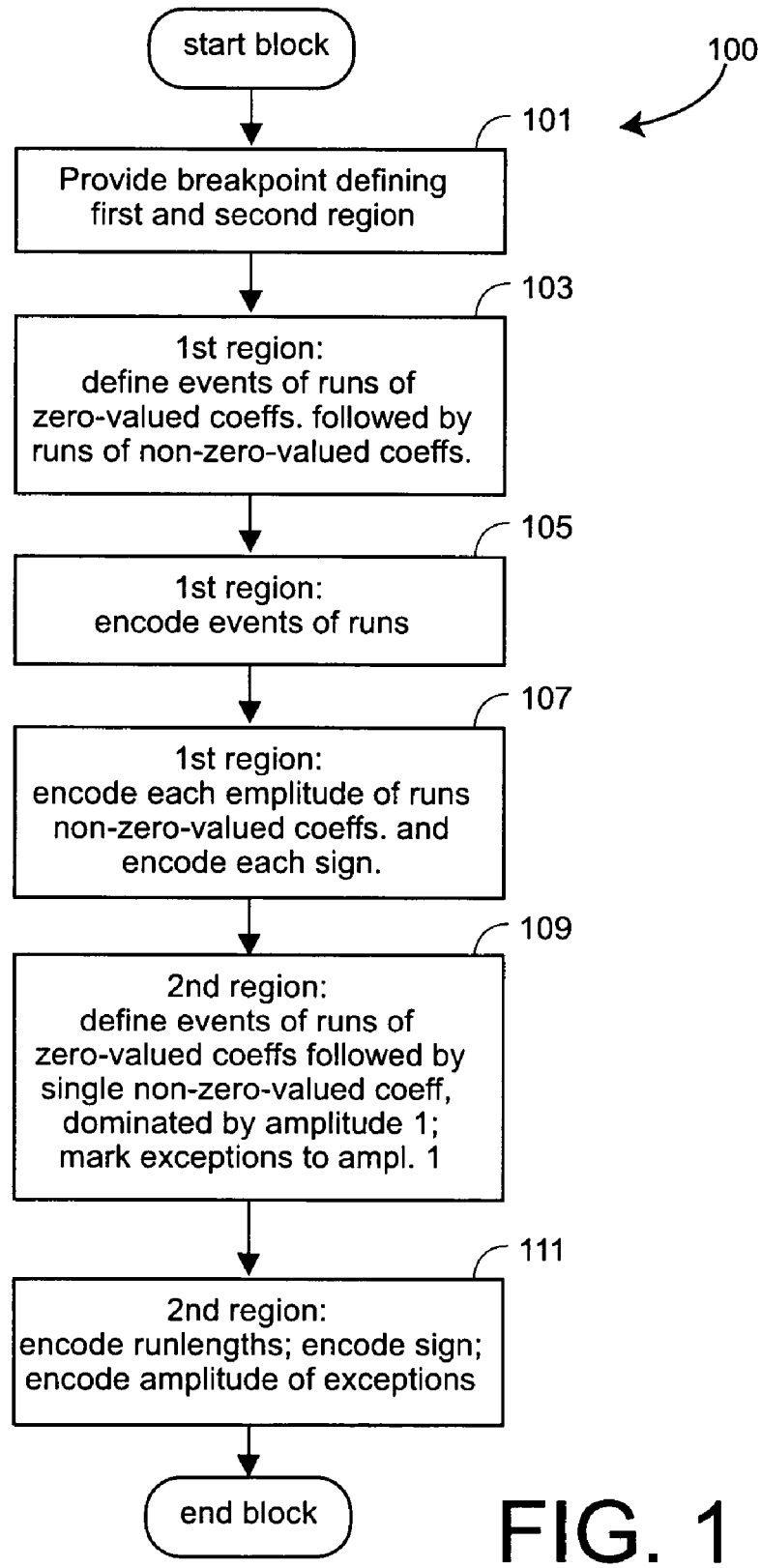
FIG. 1 shows a flow chart of one embodiment of a hybrid variable length coding (VLC) method that does not include an embodiment of the present invention for encoding of a plurality of amplitudes in a run of non-zero-valued coefficients.

FIG. 1 shows a flow chart of one embodiment of a hybrid variable length coding (VLC) method 100 that includes in 101 providing a breakpoint along the ordering of the series to define a first, e.g., low frequency region wherein non-zero-coefficients are likely to be clustered, and a second, e.g., high-frequency region where non-zero coefficients are likely to be scattered, and in the version shown, likely to be dominated by amplitude-1 coefficients. In 103, each run of zero-valued coefficients that precedes a run of one or more non-zero-valued coefficients is identified. In the case that the first region coding is according to an embodiment of the 2-D Non-Zero/Zero Cluster Coding Method, the events include a zero-valued coefficient following the run of non-zero-valued coefficients, and furthermore, events that have no non-zero-valued coefficients preceding the non-zero coefficient(s) are included. In 105, the identified events are encoded using joint encoding for each event of the runlength of the preceding zero-valued coefficient and the runlength of the one or more non-zero-valued coefficients. In one embodiment, 105 includes using a two-dimensional lookup table of codes. In 107, the individual amplitudes in each run of non-zero-amplitudes in the identified event is encoded using an amplitude code, which, in one embodiment is a variable length code obtained using a code table.

Note that in one variation, 103 and 105 are replaced by a first region coding method described in the Basic Hybrid Coding Method and the Extended Hybrid Coding Method.

In the version shown, the second, e.g., high frequency region is encoded as described in the Extended Hybrid Coding method. In 109, events are defined that are each either no consecutive zero-valued coefficients, or a run of one or more zero-valued coefficients followed by a single non-zero-valued coefficient. Any such non-zero coefficient is assumed to have amplitude 1 such that no amplitude encoding is required for such a coefficient. A non-amplitude-1, non-zero coefficient is marked as an exception. Furthermore, the remainder of the block being zero is also identified. In 111, for each identified event in the second region, the runlength of the zero-valued coefficients preceding the single non-zero-valued coefficient is encoded using a variable length runlength coding method, implemented, e.g., as a coding table. The sign of the ending non-zero-value coefficient is encoded by a sign bit, and, in the case that the non-zero-valued coefficient is the exceptional case of not having amplitude 1, an exception code followed by an amplitude code is included. The amplitude code is obtained, e.g., using an amplitude coding table, which in general is different than the amplitude coding table used for encoding the non-zero-amplitudes in the first region, since the second region amplitudes are more likely to have lower value than the first region amplitudes.

In one variation, how to set up the codeword tables is described in the 2-D Non-Zero/Zero Cluster Coding Method, and includes either assuming or obtaining statistics for typical series of coefficient image blocks, or, in an adaptive system, by measurement of the relative frequencies of occurrence of events and amplitudes, depending on the coding method, e.g., code table. In another variation, how to set up the codes is described in the Basic Hybrid Coding Method and the Extended Hybrid Coding Method.

Figure 2:
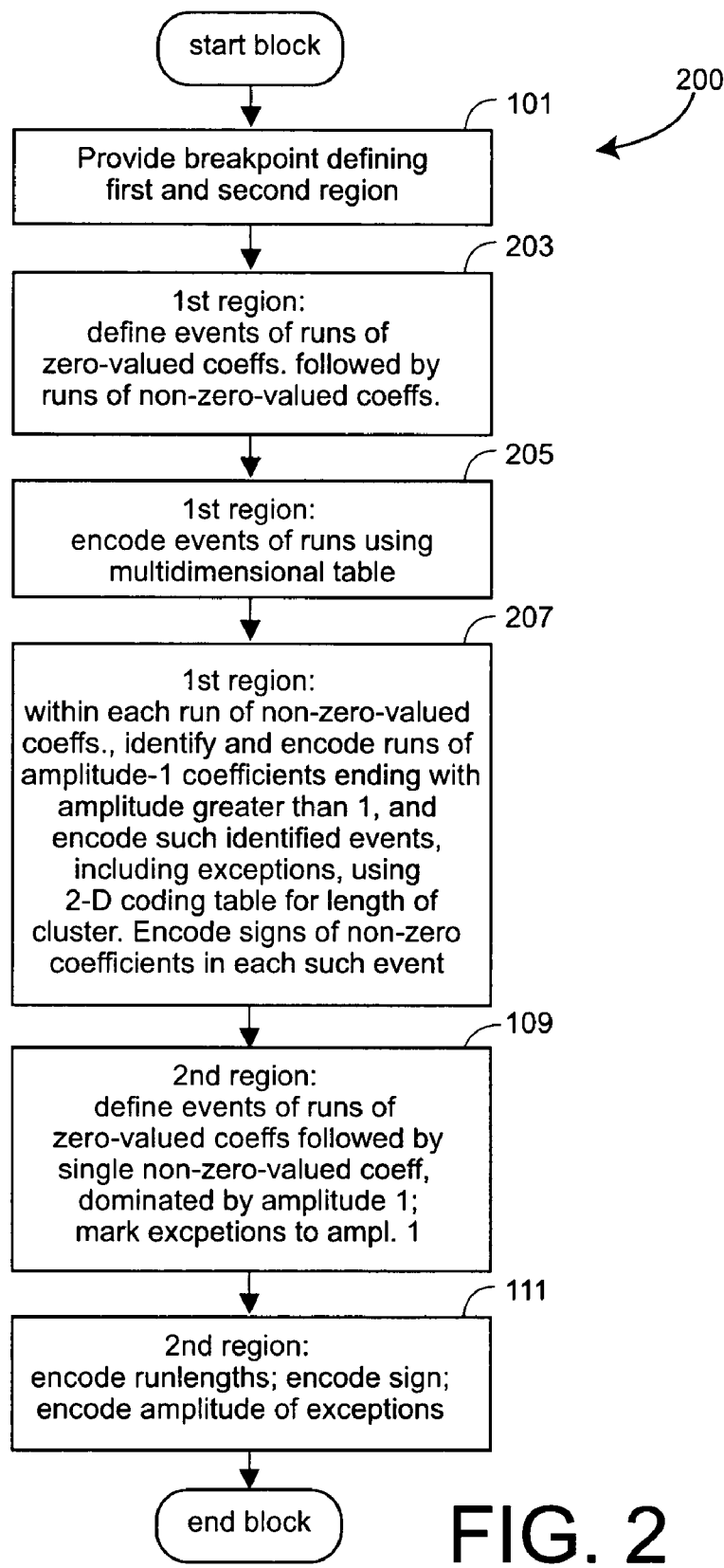
FIG. 2 shows a flow chart of one embodiment of a hybrid variable length coding (VLC) method, which includes encoding of a plurality of amplitudes in a run of non-zero-valued coefficients according to an aspect of the invention.

FIG. 2 shows a flow chart of another embodiment of a hybrid VLC method 200 that includes an aspect of the present invention, and includes instead of block 107, block 207, that for each recognized run of non-zero amplitudes in the first region, determines events that are within each run, such events including a run of amplitude-1 coefficients, and encodes each event a codeword, e.g., using a 2-D coding table for the particular run length of non-zero amplitudes. The signs also are encoded.

Note that 203 and 205 correspond to 103 and 105, respectively, of FIG. 1, but use different reference numerals to indicate that these steps need not be identical. For example, FIG. 1 may include recognizing events as described in the Basic Hybrid Coding Method and the Extended Hybrid Coding Method, while 203 and 205 may be as described in the 2-D Non-Zero/Zero Cluster Coding Method.

As in the Basic Multi-Dimensional Amplitude Coding Method, the inventors have noted that transform coefficients along a specified path, e.g., a zig-zag scan path, for a two dimensional block transform appear to be statistically distributed similarly to an exponential distribution, with the largest amplitude coefficients residing in the lowest frequency spectrum and the smallest amplitude coefficients residing in the highest frequency spectrum. When the coefficients are quantized, larger amplitude coefficients tend to be more clustered in lower frequencies and smaller coefficients tend to be more scattered in higher frequencies. Dividing the path into a low-frequency region and a high frequency region, the inventors have noticed that most of the quantized coefficients along the high frequency region are dominated by amplitudes of zero and one, and most of the quantized coefficients along the low frequency region are dominated by smaller amplitude values such as 0, 1, 2, 3, . . . , and so forth, with the appearance of amplitude 1 more likely than of amplitude 2, the appearance of amplitude 2 more likely than of amplitude 3, and so forth. It should be noted that the appearance of amplitude 0 can be more likely than of amplitude 1 for relatively low bit rate interframe coding, and the appearance of amplitude 0 can be less likely than of amplitude 1 for intraframe coding and high bit rate interframe coding.

Referring to FIG. 2, as an example, suppose a pair of "z" consecutive zero-valued coefficients and "n" consecutive non-zero-valued coefficients, followed by a single non-zero-value, is coded using the coding invention described in the 2-D Non-Zero/Zero Cluster Coding Method. Denote the positions of the zero-valued/non-zero valued coefficients by R(z,n) and denote each of the amplitudes by m(1), m(2), . . . , m(n). Denote by C(z,n) the variable length codeword for the event R(z,n), z=0,1, . . . , n=1, 2, . . . ; denote by A(a) the amplitude encoding of an amplitude a, a=1,2, . . . , in the run of non-zero-valued coefficients in R(z,n); and denote by S(1), S(2), . . . , the sign bits for the first, second, . . . , n'th non-zero-valued coefficient in R(z,n). Then, according to one embodiment described in the 2-D Non-Zero/Zero Cluster Coding Method, the encoding of the event and the corresponding non-zero amplitudes is:

$$C(z,n)+A(m(1))+S(1)+A(m(2))+S(2)+ \ldots +A(m(n))+S(n),$$

where + denoted concatenation.

Similarly, consider the Basic Hybrid Coding Method and the Extended Hybrid Coding Method. Denote by r(n) the run of n consecutive non-zero coefficients, and r'(z) the run of z consecutive zero-valued coefficients in the first region, n,z=1, 2, . . . . Consider a single event denoted by r(n), denote each of the non-zero amplitudes in r(n) by m(1), m(2), . . . , m(n). Denote by C(n) the variable length codeword for the run length of non-zero-valued coefficients in the event r(n), n=1, 2, . . . and C'(z) the variable length codeword for the run length of zero-valued coefficients in the event r'(z), z=1,2, . . . ; denote by A(a) the amplitude encoding of an amplitude a, a=1,2, . . . , in the run r(n) of non-zero-valued coefficients; and denote by S(1), S(s), . . . , the sign bits for the first, second, . . . , n'th non-zero-valued coefficient in r(n). Then according to embodiments described in the Basic Hybrid Coding Method and the Extended Hybrid Coding Method, the encoding of the event and the corresponding non-zero amplitudes is:

$$C(n)+A(m(1))+S(1)+A(m(2))+S(2)+ \ldots +A(m(n))+S(n)+C'(z).$$

One aspect of the Basic Multi-Dimensional Amplitude Coding Method described in above-mentioned incorporated-by-reference U.S. patent application Ser. No. 10/922,507 is to use a single codeword obtained by a multidimensional amplitude encoding method to encode the sequence of amplitudes A(m(1)), A(m(2)), . . . ,A(m(n)). For example, denote by $A_n$(m(1), m(2), . . . , m(n)) the codeword for the sequence of n quantized amplitudes m(1), m(2), m(n), n=1,2, . . . According to one embodiment of the Basic Multi-Dimensional Amplitude Coding Method, the event R(z,n) and associated amplitudes and signs is encoded, when using the 2-D Non-Zero/Zero Cluster Coding Method together with an embodiment of the Basic Multi-Dimensional Amplitude Coding Method as:

$$C(z,n)+A_n(m(1), m(2), \ldots , m(n))+S(1)+S(2)+ \ldots +S(n),$$

and in one embodiment when using the Basic Hybrid Coding Method or the Extended Hybrid Coding Method with the Basic Multi-Dimensional Amplitude Coding Method, as:

$$C(n)+A_n(m(1), m(2), \ldots , m(n))+S(1)+S(2)+ \ldots +S(n)+C'(z).$$

In order to make the size of the multi-dimensional tables manageable from a practical implementation point of view, the maximum length of the run of non-zero amplitudes jointly encoded using the Basic Multi-Dimensional Amplitude Coding Method is restricted to relatively low numbers such as 2 or 3 in a practical implementation.

The present invention uses an alternate to a multidimensional table to encode the cluster of n non-zero-amplitude coefficients in the first region.

The inventors notice that when runs of consecutive non-zero-amplitude coefficients, i.e., clusters of non-zero amplitudes are identified, the histogram of the coefficient amplitudes tends to be dominated by values of 1 and then 2, . . . , and so forth. It is with these observations in mind that an efficient coding technique is described herein to take advantage of the dominance of ones.

One aspect of the present invention includes in the first region, identifying clusters, i.e., runs of consecutive non-zero-amplitude coefficients, and in each such cluster, further identifying one or more events that each includes a run of consecutive amplitude 1 coefficients that ends with a coefficient of amplitude greater than 1.

Each such event of a run of amplitude 1 coefficients ending in a value greater than 1 has a probability—a likelihood—of occurrence. The likelihood of occurrence may be estimated by tabulating the relative frequency of occurrence to obtain a histogram, or may be assumed, either from histograms of typical images or otherwise.

FIG. 3 shows a table of relative likelihoods of occurrences for runs of 1's within a run of n non-zero amplitude coefficients. In FIG. 3, $P_n(j,k)$ denotes the relative likelihood of a run of a number, denoted j, of amplitude-1 coefficients ending in a coefficients of amplitude greater than 1, such an amplitude denoted by k, k>1, with j=0, 1, ... n−1.

Since the runs of the non-zero values can be all amplitude 1, such events, called exceptions, have been denoted as "Exc" and the relative likelihood of such events denoted by $P_n(Exc)$.

The table of FIG. 3 is for identified runs of amplitude 1 in a cluster of n consecutive non-zero-amplitude coefficients in the first region. There is such a table of likelihoods for each length of a run of consecutive non-zero amplitude coefficients. Therefore, there are n such tables.

One embodiment of the invention includes providing a codeword for each such identified event within each cluster. For example, in one embodiment, an optimal variable length code is assigned for each of the identified events according to the relative likelihoods $P_n(j,k)$ and $P_n(Exc)$, with the most likely-to-occur event assigned the code with the least number of bits and the least likely-to-occur event assigned the longest codeword. FIG. 4 shows a code table for events identified in a consecutive run of n non-zero amplitude coefficients. In FIG. 4, $C_n(j,k)$ denotes the codeword for an identified run of j amplitude-1 coefficients ending in a coefficients of amplitude k greater than 1, and $C_n(Exc)$ denotes the codeword for events in the cluster of n non-zero coefficients that end in amplitude 1.

Thus the more likely-to-occur events use variable length codes. These codes are obtained by assuming or measuring statistics of combinations, and assigning variable length codewords according to the assumed or measured statistics, using code allocation methods known in the art, e.g., Huffman codes, non-Huffman Arithmetic codes, and so forth. Furthermore, in one embodiment, some of the less likely-to-occur amplitude combinations are assigned a fixed length code preceded by an escape code.

Figure 5:
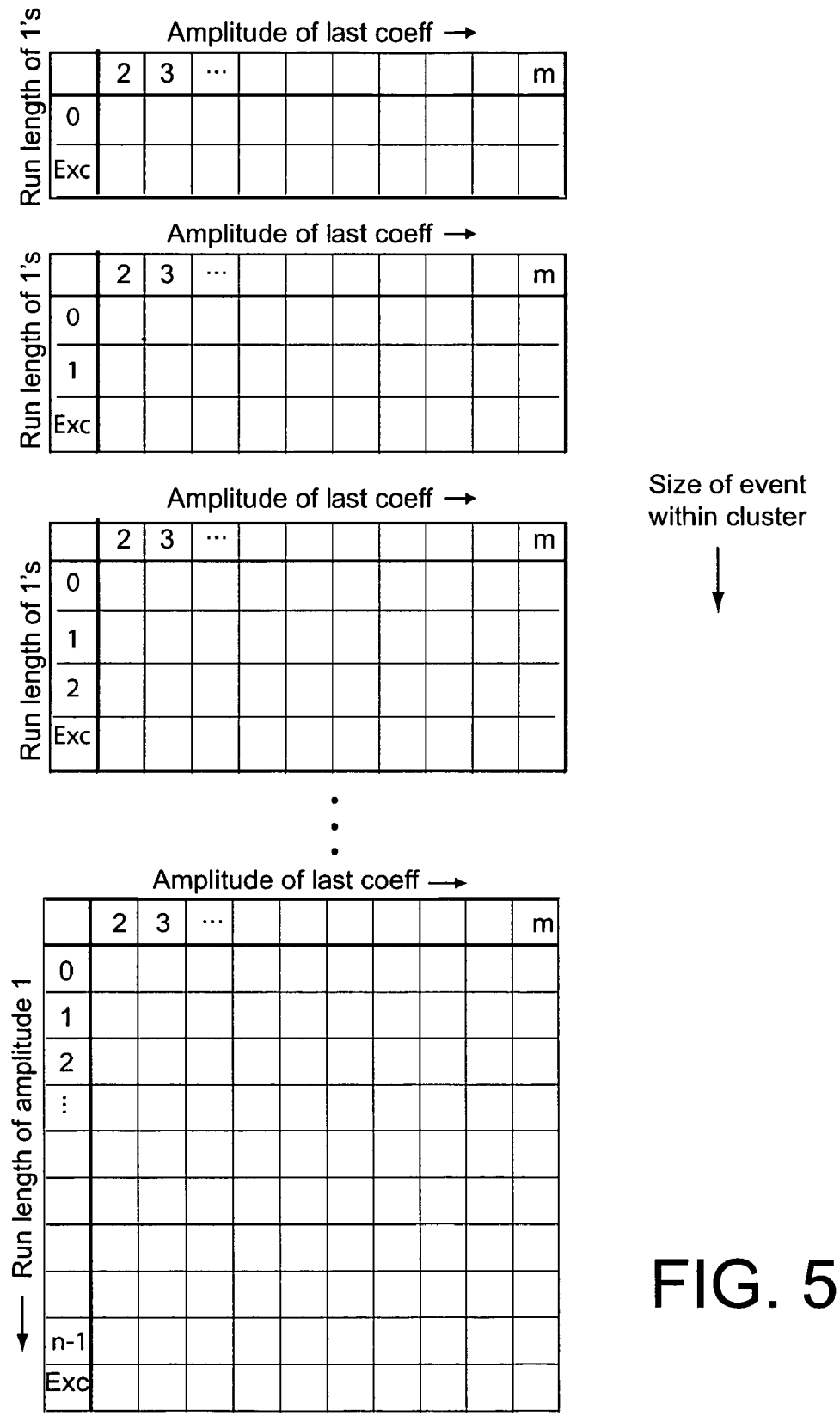
FIG. 5 shows a sequence of code tables for events identified in different lengths of clusters of consecutive non-zero-valued coefficients, according to an aspect of the invention.

FIG. 5 shows a sequence of code tables for events identified in different lengths of clusters of consecutive non-zero-valued coefficients, according to an aspect of the invention. Thus, FIG. 5 shows a table for a cluster of one non-zero-valued coefficients, a cluster of two non-zero-valued coefficients, ..., up to a cluster of a number n of non-zero-valued coefficients. Each table includes ending amplitudes up to a number denoted m. In one version, in each such table, fixed length codes may be used for those least likely-to-occur events.

As an example, suppose the following cluster—run of consecutive non-zero amplitudes—of length 10 is identified:

1 −1 1 2 1 −3 −1 −1.

Within this cluster are the three events:

1 −1 1 1 2

1 −3

−1 1 −1.

According to one embodiment of the invention, the identified cluster is encoded as:

$(C_{10}(4,2)+S_++S_-+S_++S_++S_+)+(C_{10}(1,3)+S_++S_-)+(C_{10}(Exc)+S_-+S_++S_-)$ where + denoted concatenation, and $S_+$ and $S_-$ represent the codes for positive and negative signs, respectively.

Thus, compared to the Basic Multi-Dimensional Amplitude Coding Method, a single codeword obtained via a potentially large multidimensional coding table for coding a sequence of non-zero amplitudes is replaced by a number of codewords, each obtained by a simple 2-D coding table.

Consider as an example the following ordered sequence of quantized transform coefficients in the low frequency region, excluding the dc coefficient, for a soft break point at N=18:

3 −1 1 1 −2 1 1 0 0 −1 2 1 1 −1 0 0 0 1 | 0.

The breakpoint is indicated by |. Consider encoding the coefficients in the first region using the 2-D Non-Zero/Zero Cluster Coding Method or a similar method as suggested in above-mentioned incorporated-by-reference U.S. patent application Ser. No. 10/922,508.

Assuming no DC coefficient, the first identified cluster followed by a single zero-valued coefficient is at position R(0,7) and is

3 −1 1 1 −2 1 1 0

Furthermore, this cluster includes the events

3

−1 1 1 −2, and 1 1

Thus, this first cluster is encoded by $C(0,7)+C_7(0,3)+S_++C_7(3,2)+S_-+S_++S_++S_-+C_7(Exc)+S_++S_-.$ where C(0,7) is the codeword for positioning of the zero-valued runs and the non-zero clusters according to the 2-D Non-Zero/Zero Cluster Coding Method.

The next non-zero cluster followed by a single zero-valued coefficient is

−1 2 1 1 −1 0 and is at position R(1,5). This non-zero cluster of length includes the events

−1 2 and 1 1 −1.

Thus this second cluster is encoded by $C(1,5)+C_5(1,2)+S_-+S_++C_5(Exc)+S_++S_++S_-.$ The next (and last) non-zero cluster in the first region is at position code R(2,1) and is 1 0. This cluster is encoded by:

$C(2,1)+C_1(Exc)+S_+.$

Therefore, the whole first region is encoded by $C(0,7)+C_7(0,3)+S_++C_7(3,2)+S_-+S_++S_++S_-+C_7(Exc)+$
$S_++S_-+C(1,5)+C_5(1,2)+S_-+S_++C_5(Exc)+S_++S_++$
$S_-+C(2,1)+C_1(Exc)+S_+.$ The amplitude coding method described that includes identifying n any cluster runs of amplitude 1 coefficients that end in a non-zero coefficient of amplitude other than 1 or that only include amplitude-1 coefficients is called the Multi-Table Coding Method herein.

Regarding the joint encoding of identified events according to the 2-D Non-Zero/Zero Cluster Coding Method, in one version, each identified event only includes up to a pre-determined number of coefficients, called the maximal length herein, such that some events of the maximal length include a first run of one or more consecutive non-zero-valued coefficients not followed by a single zero-valued coefficient, followed by either no consecutive zero-valued coefficients or by a second run of one or more consecutive zero-valued coefficients. This provides for encoding an event with more than the pre-determined number of coefficients as a plurality of events of at most the maximal length without using escape codes. Two or more events that together define a run of less than the maximal length zero-valued coefficients followed by a run of any length of non-zero-valued coefficients is called a "generalized event" herein in that it is treated as a single event for some purposes, including, for example, establishing the first and second region using what is called a soft boundary.

Note that the inventors have noted that for short clusters, e.g., n=2 or 3, the Basic Multi-Dimensional Amplitude Coding Method works well, while for longer clusters, e.g., n>3, the Multi-Table Coding Method described above is preferred. Thus, one embodiment of the invention uses both the Basic Multi-Dimensional Amplitude Coding Method and the Multi-Table Amplitude Coding Method depending on the length of the cluster of non-zero-valued coefficients.

For example, in the case that the Basic Multi-Dimensional Amplitude Coding Method is used for cluster lengths $n \leq 3$, and the Multi-Table Amplitude Coding Method is used for cluster lengths n>3, and the 2-D Non-Zero/Zero Cluster Coding Method is used for encoding the relative position of a cluster of non-zero-valued coefficients of length n, then the code for the cluster and position may be expressed as if $n \leq 3$ then $C(z,n)+A_n(m(1), m(2), \ldots, m(n))+S(1)+S(2)+\ldots+S(n)$, else if $n>3$ then $C(z,n)+\Sigma_i\{C_n(j_i,k_i)+S_i(1)+\ldots+S_i(j_i+1)\}$.

Another way of expressing this coding function is as:

$\alpha V_{R(z,n), A_n}\{R(z,n),m(1), \ldots ,m(n)\}+(1-\alpha)V_{R(z,n),C_n}\{R(z,n), (j_1,k_1),(j_2,k_2), \ldots\}$, where $\alpha=1$ for short clusters of non-zero-valued coefficients, for example, values of n=1, 2, or 3, and $\alpha=0$ for n>3.

Coding using the code of the 2-D Non-Zero/Zero Cluster Coding Method and the code of the Multi-Dimensional Amplitude Coding Method for short clusters, or the code of the Multi-Table Amplitude Coding Method for longer clusters to code the non-zero-valued coefficients in the first (low-frequency) region includes identifying runs of zero-valued coefficients preceding runs (cluster) of non-zero coefficients followed by a single zero-valued coefficient. The method further includes encoding the non-zero amplitudes with a multi-dimensional code for clusters of up to three non-zero coefficients, and, for any cluster of n>3 consecutive non-zero coefficients, identifying events of a run of consecutive amplitude 1 coefficients followed by a single coefficient of amplitude greater than 1.

Consider, as an example, coding the following sequence of quantized transform coefficients in the low frequency region, excluding the DC coefficient, and assuming a breakpoint N=19:

−1 1 1 −2 1 1 0 0 −1 2 1 0 1 −1 0 0 0 1 I 0, where I represents the breakpoint.

Using I to separate such runs of zero preceding clusters of non-zeroes followed by a single zero, the low frequency region consists of, assuming a soft boundary, the region is:

I 3 −1 1 1 −2 1 1 0 I 0 −1 2 1 0 I 1 −1 0 I 0 0 1 0.

The code using the combined method is:

$C(0,7)+C_7(0,3)+S_++C_7(3,2)+S_-+S_++S_++S_-+C_7(\text{Exc})+$
$S_++S_++C(1,3), A_3(1,2,1)+S_-+S_++S_++C(0,2)+A_2$
$(1,1)+S_++S_-+C(2,1)+A_1(1)+S_+.$ Note that for the first cluster of 7 non-zero coefficients, the Multi-Table Amplitude Coding Method is used to encode the non-zero valued coefficients, while for the other clusters of non-zero-valued coefficients, because the runlength of the cluster is three or less, the Basic Multi-Dimensional Amplitude Coding Method is used to encode the amplitudes in the cluster.

How to establish the breakpoint is described in the Basic Hybrid Coding Method. One version uses a fixed breakpoint between the first, e.g., low frequency region, and the second, e.g., high frequency region. In one embodiment, the fixed breakpoint is pre-determined for each type of image and for each type of compression method by running experiments collecting statistics on a set of typical samples of such images. Typically, different breakpoints are determined for:

intraframe and still image coding vs. interframe coding;
standard definition television images (SDTV) vs. HDTV images;
high bit rate coding methods vs. low bit rate coding methods;
DCT vs. non-DCT transforms;
and so forth.

When fixed breakpoints are used, there is already an indication passed on to the decoder to indicate the type of image, e.g., whether interframe or intraframe. Thus, there is typically no need to send a further indication to the decoder of the breakpoint.

The inventors performed experiments on typical still images—applicable also to intraframe images in motion coding—by performing variable length coding according to embodiments of the present invention, and plotting the size of the compressed image for different breakpoint values for the case of 8 by 8 blocks quantized to 127 non-zero amplitudes using the DCT, and observed that a breakpoint of 22 worked for most images, although some images worked well with a breakpoint of about 12. Therefore, in one embodiment, for intraframe and still images for DCT transform coding, a pre-selected fixed breakpoint of 22 was used.

In a first variation, the breakpoint is image dependent and selected from a finite set according to a breakpoint selection criterion. For example, from the above-described experiments, the compression using a first breakpoint of 22 was compared to the compression using a second breakpoint of 10, and the breakpoint that gave the higher compression was used. Other breakpoint selection criteria also are possible, e.g., by looking at the statistics of runs of zero-valued coefficients and non-zero-valued coefficients.

When such an image-dependent breakpoint is used, an indication of the breakpoint is also sent with each set of coefficients. In one embodiment, a 2-bit indication is sent. This provides for each block to be encoded using one of 4 pre-defined breakpoints. In an alternate embodiment, the indication of which pre-defined breakpoint is sent as a variable length code such that more common breakpoints are encoded by a shorter code.

While typically, the set of possible breakpoints is a small subset of the possible positions in the series, in yet another variation, the image dependent breakpoint is selected from anywhere in the series, or, in an alternate variation, from anywhere along a subrange.

In an improved embodiment, instead of the breakpoint defining a fixed boundary between the first and second region, called a "hard" boundary herein, or a set of breakpoints defining a set of hard breakpoints, such that an event or generalized event that includes a sequence of up to the maximal length of consecutive zero-valued coefficients followed by a run of non-zero values that crossed the breakpoint would be regarded as a generalized event in the first region up to the breakpoint. In such a case, the breakpoint defines what is called herein a "soft" boundary in that any event that started in the first region would be encoded in the first region even if it crossed the breakpoint. Thus, the actual boundary for a particular block of coefficients might extend beyond the breakpoint.

Thus, according to one method embodiment of the invention, one 2-D position code table is used to represent the runs of clustered zeros and clustered non-zero-valued coefficients that end in a single zero-valued coefficient, as described in the 2-D Non-Zero/Zero Cluster Coding Method, and a number of relatively short 2-D amplitude code tables, such a number denoted by "n," with the length of the tables ranging from 1 to n, are used to encode events that are each runs of amplitude-1 coefficients terminating in an amplitude greater than 1 within the cluster of n non-zero-valued coefficients.

The inventors have found that using such a method provides performance as good as or superior to the methods proposed in The Basic Hybrid VLC Method of above-mentioned incorporated-by-reference U.S. patent application Ser. No. 10/869,229 and the 2-D Non-Zero/Zero Cluster Coding Method of above-mentioned incorporated-by-reference U.S. patent application Ser. No. 10/922,508. It is also comparable to the Basic Multi-Dimensional Amplitude Coding Method of the above-mentioned incorporated-by-reference U.S. patent application Ser. No. 10/922,507 with the advantage of ease of implementation.

Apparatus

Figure 6:
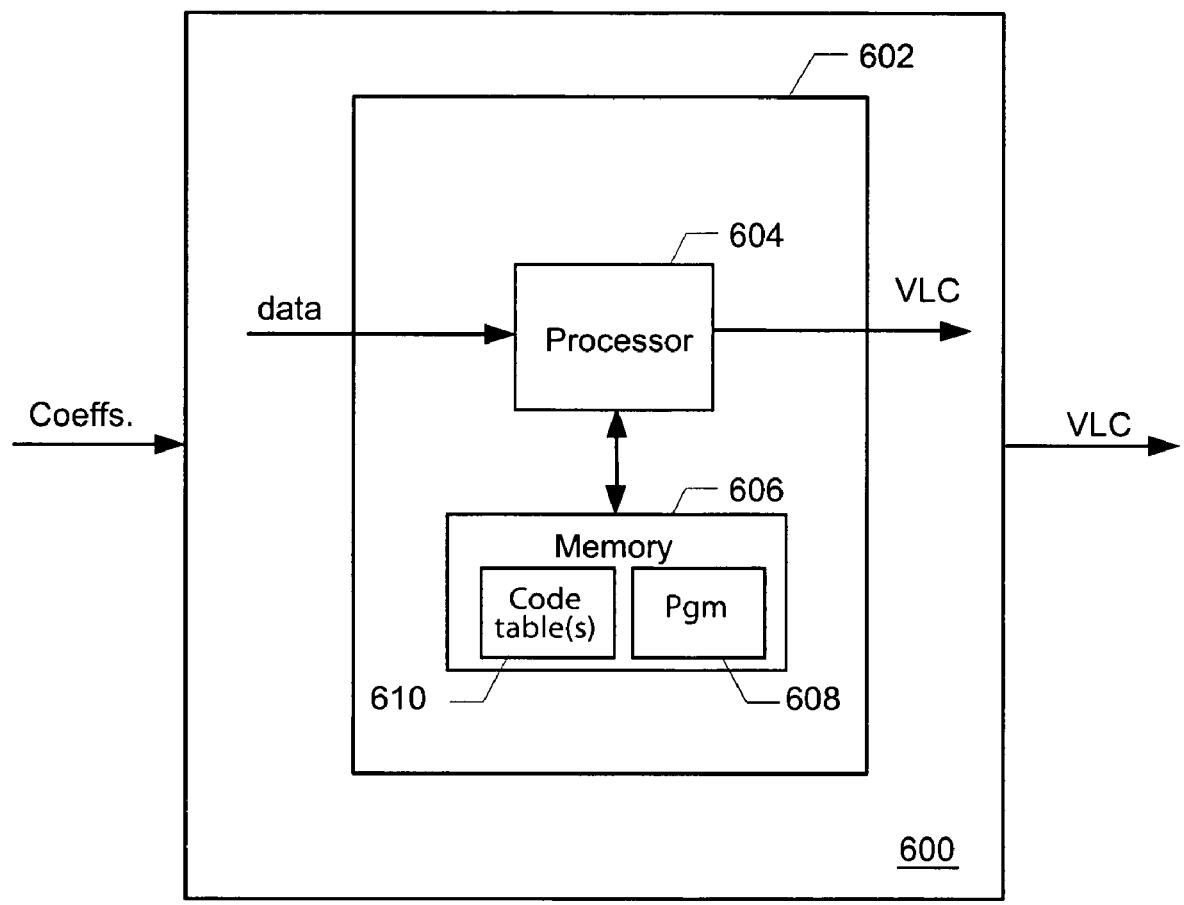
FIG. 6 shows an apparatus for coding a series of digital signals, e.g., an ordered series of quantized coefficients of a transformed block of image data, including a processing system that has a memory containing code that implements an embodiment of the coding method described herein.

Another aspect of the invention is an apparatus for coding a series of digital signals, e.g., an ordered series of quantized coefficients of a transformed block of image data. FIG. 6 shows an apparatus 600 that includes a processing system 602 that includes one or more processors 604 and a memory 606. A single processor is shown in FIG. 6 and those in the art will appreciate that this may represent several processors. Similarly, a single memory subsystem 606 is shown, and those in the art will appreciate that the memory subsystem may include different elements such as RAM, ROM, and so forth. In addition, the memory subsystem is meant to include any non-volatile memory storage such as a magnetic or optical storage component. A computer program 608 is included and is loaded into the memory 606. Note that at any time, some of the program may be in different parts of the memory subsystem, as will be understood by those in the art. The program 608 includes instructions to instruct the processor to implement, in different versions, the different coding methods described above. The processor thus accepts as data the ordered coefficients and generates the codewords. The apparatus 600 further includes in the memory subsystem 606 a coding data structure 610 that provides the codewords for sets of one or more coefficients as described in any one of the novel coding methods described herein. In one embodiment, the data structure is in the form of one or more tables.

Note that FIG. 6 does not show details such as bus structures, I/O structures, etc., that may be included since the need for such structures would be known to those in the art and their inclusion would only obscure the inventive aspects of the apparatus. Furthermore, the processing system may be implemented using one or more general purpose microprocessors, one or more microcontrollers that include several memory and other elements, one or more DSP devices, or any other programmable processors. Furthermore, the processors may be standalone devices, or may be implemented as "cores" to be included in an ASIC, gate array, or other device.

Another aspect of the invention is a memory (such as memory 606 in FIG. 6) that stores a coding data structure that provides the codewords for sets of one or more coefficients as described in any one of the novel coding methods described herein. In one embodiment, the data structure is in the form of one or more tables.

Thus, a variable length coding method and apparatus has been described suitable for encoding the quantized transform coefficients of blocks of images as occur in common image compression methods.

Another aspect of the invention is a method to decode a bitstream in order to form a series of quantized coefficients of a transform of a block of image data, the transform such that 0 is the most likely coefficient amplitude and 1 is the next most likely coefficient amplitude. The bitstream is encoded by the coding method described above including, for a first contiguous region in the series, identifying runs that each includes one or more consecutive coefficients having any non-zero amplitude. For each identified run, the coding method includes encoding the relative positions of the runs, and of any intervening consecutive zero-valued coefficients, and further, for each identified run, identifying events of at least one consecutive coefficient, an identified event including a sequence of at least one consecutive amplitude-1 coefficient ending in a coefficient of amplitude greater than 1, or including only a coefficient of amplitude greater than 1, or including of only a sequence of consecutive amplitude-1 coefficients. Each identified event for the runlength of the identified run is defined by the length of the sequence of at least one consecutive amplitude-1 coefficients, and by the amplitude of the ending coefficient. The coding method further includes encoding each identified event by at least one codeword such that for at least some identified events, relatively more likely-to-occur events are encoded by a shorter codeword than relatively less likely-to-occur events.

The decoding method includes recognizing a codeword, determining the event represented by the recognized codeword; and determining the sub-series of coefficients of each determined event, until all coefficients in the series are determined.

Figure 7:
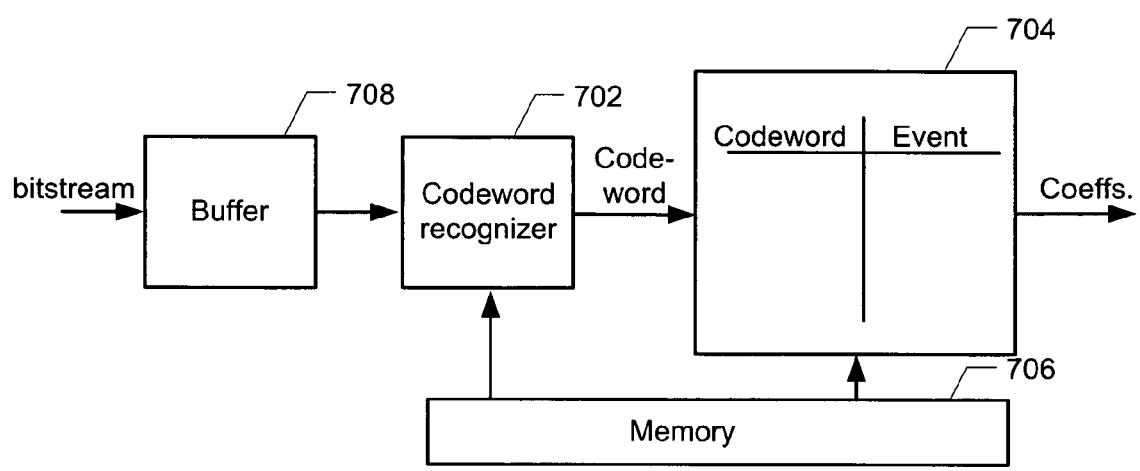
FIG. 7 shows an apparatus embodiment for decoding a bitstream representing series of codewords encoded according to one or more aspects of the present invention.

Another aspect of the invention is an apparatus for decoding a bitstream encoded by any of the methods described herein or in the Patent Applications described in the RELATED PATENT APPLICATIONS Section. FIG. 7 shows one embodiment of the apparatus. A codeword recognizer 702 accepts the bits of a bitstream and recognizes a codeword of a set of possible codewords that each represents an event. The codeword recognizer determines which of the five coding tables the codeword is from. A decoder 704 is coupled to the codeword recognizer 702 and determines the data for the codeword recognized by the codeword recognizer, e.g., the runlength of non-zeroes, the runlength of zeroes, the sign, etc. In one embodiment, the decoder 704 includes a lookup device that looks up the appropriate decoding table stored in a memory 706. That table provides the event for at least some of the codewords of the set of codewords. Other codewords may include an escape code, so that decoding is by other than a table lookup method. In one embodiment, the bitstream is stored in a buffer 708, and the output of the buffer is coupled to the codeword recognizer.

While in the embodiment shown in FIG. 7, the memory is shown separate from the lookup device, those in the art will understand that in other embodiments, the lookup device includes memory for the tables, and such other embodiments are included herein.

Note further that in FIG. 7, the codeword recognizer and also the lookup device may be each implemented on a computer as a set of instructions stored in a memory, e.g., the memory 706, that instruct one or more processors to carry out the operations of the recognition and of the lookup.

Another aspect of the invention is a memory (such as memory 706 in FIG. 7) that stores a decoding data structure that provides the data for any set of codewords recognized in a bitstream of compressed image data. The bitstream is coded by any one of the novel coding methods described herein. In one embodiment, the data structure is in the form of one or more tables.

The coding and decoding methodologies described herein are, in one embodiment, performable by a machine which includes a one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, one typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine readable code segments (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine readable code.

In alternative embodiments, the machine operates as a standalone device or may be connected, e.g., networked to other machines, in a networked deployment, the machine may operate in the capacity of a server or a client machine in a server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., one or more processors that are part of an image encoder. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

It should further be appreciated that although the invention has been described in the context of transform encoding of images, the invention is not limited to such contexts and may be utilized in various other compression applications and systems. Furthermore, the invention is not limited to any one type of architecture or type of transform encoding. For example, the DCT is mentioned above as one transform. Other transforms may be used, e.g., the new H.264/MEG-4 AVC video coding standard/draft standard defines 4×4 blocks and a DCT-like 4×4 integer transform. The invention does not depend on any particular type of interframe coding if used, or of motion compensation if used for interframe coding, or any intra-estimation if used for estimating the pixels of a block using information from neighboring blocks.

Note that variable length coding is sometimes referred to as entropy coding or statistical coding.

Note that in one embodiment for amplitude encoding, 127 possible non-zero values are possible for the coefficients. The invention however is not restricted to any number of possible quantization values.

Note also that the term amplitude is irrespective of sign. Therefore, for example, coefficient of values +1 and −1 both have amplitude 1.

Note that the terms coding and encoding are used interchangeably herein.

Note also that the present invention does not depend on the particular type of VLC used for any of the coding methods, e.g., the coding tables, and can work, for example, with Huffman coding and with arithmetic coding methods. Furthermore, while embodiments have been described that used fixed encoding for the events based on assumed or a priori likelihoods of occurrence of the events (also called the symbols), i.e., the likelihoods of occurrence of the events do not change, other embodiments use adaptive encoding, i.e., the encoding is changeable according to statistical data such as histograms collected from the actual coefficients.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method of operating an encoding apparatus, the apparatus configured to encode an ordered series of digital signals that each have a respective value, including a respective amplitude from a finite set of amplitudes consisting of the most likely-to-occur amplitude and at least one other amplitude, the at least one other amplitude including a next most likely-to-occur amplitude to the most likely-to-occur amplitude, the method comprising:

for a first contiguous region in the series:

identifying runs that each includes one or more consecutive signals each having any amplitude other than the most likely-to-occur amplitude; and for each of at least some of the identified runs encoding the relative position and runlength of the identified run, and of any intervening consecutive signal having the most likely-to-occur amplitude;

identifying amplitude events of at least one consecutive signal within the identified run, an identified amplitude event being (a) a sequence of at least one consecutive signal having the next most likely-to-occur amplitude that ends in a signal having other than the next most likely-to-occur amplitude, (b) only a signal having other than the next most likely-to-occur amplitude not preceded by a signal having the next most likely-to-occur amplitude, or (c) only a sequence of consecutive signals having the next most likely-to-occur amplitude not followed by a signal having other than the next most likely-to-occur amplitude, each identified amplitude event within the identified run defined by the length of the sequence of at least one consecutive signal having the next most likely-to-occur amplitude, and by the amplitude of the ending signal; and encoding each identified amplitude event by at least one codeword such that for at least some identified amplitude events, relatively more likely-to-occur amplitude events are encoded by shorter respective codewords than relatively less likely-to-occur amplitude events, such that relatively short codewords are formed to represent signal values or sequences of signal values that are relatively more likely-to-occur, and relatively long codewords are formed to represent signal values or sequences of signal values that are relatively less likely-to-occur.

2. A method as recited in claim 1,
wherein the series of digital signals is a series of quantized coefficients of a transformed block of image data formed by a transform configured such that the most likely-to-occur amplitude is 0, and the next most likely-to-occur amplitude is 1, such that the step of identifying runs identifies runs that each includes a run with one or more non-zero-valued coefficients, and such that each identified amplitude event in an identified run includes a sequence of at least one consecutive coefficient of amplitude 1 that ends in an amplitude greater than 1, or a single coefficient of amplitude greater than 1, or a sequence of consecutive coefficients having only amplitude 1.

3. A method as recited in claim 2, wherein the identifying of amplitude events is for every identified run of non-zero coefficients in the series.

4. A method as recited in claim 2, wherein the identifying of amplitude events is for those identified runs of non-zero coefficients in the series that have a runlength less than or equal to a pre-selected length, the method further comprising:
for the identified runs of consecutive non-zero coefficient having a runlength greater than the pre-selected length, for each identified run of the greater runlength,
encoding the relative position and runlength of the identified run, and of any intervening consecutive coefficients having the most likely-to-occur amplitude;
jointly encoding the non-zero amplitudes of the non-zero amplitudes by a multi-dimensional coding function of the amplitudes to produce a codeword such that for at least some runs of non-zero amplitudes, relatively more likely-to-occur amplitude runs are encoded by a shorter codeword than relatively less likely-to-occur amplitudes.

5. A method as recited in claim 2, wherein the transformed block of image data includes a DC term, and wherein the DC term is separately encoded, such that the series of digital signals is a set of non-DC quantized coefficients of a transformed block of image data.

6. A method as recited in claim 2, wherein the step of encoding each identified amplitude event includes separately encoding the signs of the amplitudes.

7. A method as recited in claim 2, wherein the step of encoding each identified amplitude event uses an encoding table that provides a codeword for each pair of the runlength of the sequence of preceding amplitude-1 coefficients and the amplitude of the ending coefficient of amplitude greater than 1, such that a different encoding table may be used for each runlength of an identified run of non-zero coefficients.

8. A method as recited in claim 7, wherein the coding table is constructed by assigning a variable length code according to measured or assumed statistics of amplitude events.

9. A method as recited in claim 2, wherein the step of identifying runs is part of a process that includes identifying a run of consecutive zero-valued coefficients preceding a run of one or more consecutive non-zero-valued coefficients followed by a single zero-valued coefficient, or identifying no zero-valued coefficients preceding a run of one or more consecutive non-zero-valued coefficients followed by a single zero-valued coefficient; and
wherein the step of encoding the relative position and runlength of the identified run includes jointly encoding the runlengths of the preceding run of zero-valued coefficients and the following run of non-zero-valued coefficients, such that for at least some amplitude events, relatively more likely-to-occur pairs of runlengths are encoded by a shorter codeword than relatively less likely-to-occur runlengths.

10. A method as recited in claim 9, further comprising:
providing a breakpoint to define the first contiguous region along the ordering of the series followed by a second contiguous region; such that the coefficients of the first contiguous region are encoded by a first encoding method that includes the step of identifying runs, the step of encoding the relative position and runlength, the step of identifying amplitude events, and the step of encoding each identified amplitude event; and
encoding the coefficients in the second contiguous region using a second region encoding method, and
wherein the first region encoding method and the second region encoding method are such that the encoding of at least some of the coefficients or runs of coefficients in the first contiguous region is different than the encoding of at least some of the coefficients or runs of coefficients in the second contiguous region.

11. A method as recited in claim 9, wherein the step of jointly encoding the runlengths uses a two-dimensional coding table.

12. A method as recited in claim 2,
wherein the step of identifying runs includes determining the runlengths of one or more non-zero-valued coefficients followed by a single zero-valued coefficients, and determining the runlengths of any zero-valued coefficients preceding the runs of one or more non-zero-valued coefficients; and
step of encoding the relative positions and runlengths of the identified runs includes:
encoding the determined runlengths of the identified runs of non-zero-valued coefficients using a first runlength coding method, and encoding the determined runlengths of any preceding runs of zero-valued coefficients uses a second runlength coding method,
such that for at least some amplitude events, relatively more likely-to-occur pairs of runlengths are encoded by a shorter codeword than relatively less likely-to-occur runlengths.

13. A computer readable storage hardware medium carrying machine readable code including instructions for performing, when executed by a processor, a method of processing an ordered series of digital signals that each have a respective value including a respective amplitude from a finite set of amplitudes consisting of the most likely-to-occur amplitude and at least one other amplitude the method comprising:
for a first contiguous region in the series:
identifying runs that each includes one or more consecutive signals having any amplitude other than the most likely-to-occur amplitude;
for each identified run, identifying amplitude events of at least one consecutive signal, an identified amplitude event including a sequence of at least one consecutive signal having the next most likely-to-occur amplitude that ends in a signal having other than the next most likely-to-occur amplitude, or including only a signal of amplitude other than the next most likely-to-occur amplitude, or including a sequence of consecutive signals having only the next most likely-to-occur amplitude, each identified amplitude event for the length of the identified run defined by the length of the sequence of at least one consecutive signal having the next most likely-to-occur amplitude, and by the amplitude of the ending signal; and encoding each identified amplitude event by at least one codeword such that for at least some identified amplitude events, relatively more likely-to-occur amplitude events are encoded by a shorter codeword than relatively less likely-to-occur amplitude events, such that relatively short codewords are formed to represent signal values or sequences of signal values that are relatively more likely-to-occur, and relatively long codewords are formed to represent signal values or sequences of signal values that are relatively less likely-to-occur.

14. A computer readable hardware medium as recited in claim 13,
wherein the series of digital signals is a series of quantized coefficients of a transformed block of image data formed by a transform such that the most likely-to-occur amplitude is 0, and the next most likely-to-occur amplitude is 1, such that the step of identifying amplitude events identifies amplitude events that each includes a run of one or more non-zero-valued coefficients.

15. A computer readable hardware medium as recited in claim 14, wherein the step of encoding each identified amplitude event includes separately encoding the signs of the amplitudes.

16. A computer readable hardware medium as recited in claim 14, wherein the encoding of the identified amplitude events, uses an encoding table that provides a codeword for each pair of the runlength of the sequence of preceding amplitude-1 coefficients and the amplitude of the ending coefficient of amplitude greater than 1, such that a different encoding table may be used for each runlength of an identified run of non-zero coefficients.

17. A hardware apparatus for processing an ordered series of digital signals that each have a respective value including a respective amplitude from a finite set of amplitudes consisting of the most likely-to-occur amplitude and at least one other amplitude, the apparatus comprising:
means for identifying, in a first contiguous region in the series, runs that each includes one or more consecutive signals having any amplitude other than the most likely-to-occur amplitude;
means for encoding the relative positions and runlengths of at least some of the identified runs of consecutive signals having any amplitude other than the most likely-to-occur amplitude and of any intervening consecutive coefficients having the most likely-to-occur amplitude;
means for identifying amplitude events of at least one consecutive signal in each identified run, an identified amplitude event including a sequence of at least one consecutive signal having the next most likely-to-occur amplitude that ends in a signal having other than the next most likely-to-occur amplitude, or including only a signal of amplitude other than the next most likely-to-occur amplitude, or including a sequence of consecutive signals having only the next most likely-to-occur amplitude, each identified amplitude event for the length of the identified run defined by the length of the sequence of at least one consecutive signal having the next most likely-to-occur amplitude, and by the amplitude of the ending signal; and means for encoding each identified amplitude event by at least one codeword such that for at least some identified amplitude events, relatively more likely-to-occur amplitude events are encoded by a shorter codeword than relatively less likely-to-occur amplitude events, such that relatively short codewords are formed to represent values or sequences of values that are relatively more likely-to-occur, and relatively long codewords are formed to represent values or sequences of values that are relatively less likely-to-occur.

18. An apparatus as recited in claim 17,
wherein the series of digital signals is a series of quantized coefficients of a transformed block of image data formed by a transform such that the most likely-to-occur amplitude is 0, and the next most likely-to-occur amplitude is 1, such that the means for identifying of amplitude events identifies amplitude events that each includes a run of one or more non-zero-valued coefficients.

19. An apparatus as recited in claim 18, wherein the means for identifying of amplitude events is for those identified runs of non-zero coefficients in the series that have a runlength less than or equal to a pre-selected length, the apparatus further comprising:
for the identified runs of consecutive non-zero coefficient having a runlength greater than the pre-selected length, for each identified run of the greater runlength,
means for encoding the relative position and runlength of the identified run, and of any intervening consecutive coefficients having the most likely-to-occur amplitude;
means for jointly encoding the non-zero amplitudes of the non-zero amplitudes by a multi-dimensional coding function of the amplitudes to produce a codeword such that for at least some runs of non-zero amplitudes, relatively more likely-to-occur amplitude runs are encoded by a shorter codeword than relatively less likely-to-occur amplitudes,
wherein the means for jointly encoding jointly encodes a plurality of amplitudes, and separately encodes the signs of the amplitudes.

20. An apparatus as recited in claim 18, wherein the means for encoding each identified amplitude event separately encodes the signs of the amplitudes.

21. An apparatus as recited in claim 18, wherein the means for encoding each identified amplitude event uses an encoding table that provides a codeword for each pair of runlengths of the sequence of preceding amplitude-1 coefficients and the amplitude of the ending coefficient of amplitude greater than 1, such that a different encoding table may be used for each runlength of an identified run of non-zero coefficients.

22. An apparatus including a processing system, the processing system including at least a processor and a memory, and configured to accept from the memory an ordered series of digital signals that each have a respective value including a respective amplitude from a finite set of amplitudes consisting of the most likely-to-occur amplitude and at least one other amplitude, the processing system configured to cause the apparatus to:
for a first contiguous region in the series:

identify runs that each includes one or more consecutive signals having any amplitude other than the most likely-to-occur amplitude;

for each identified run, identify amplitude events of at least one consecutive signal, an identified amplitude event including a sequence of at least one consecutive signal having the next most likely-to-occur amplitude that ends in a signal having other than the next most likely-to-occur amplitude, or including only a signal of amplitude other than the next most likely-to-occur amplitude, or including a sequence of consecutive signals having only the next most likely-to-occur amplitude, each identified amplitude event for the length of the identified run defined by the length of the sequence of at least one consecutive signal having the next most likely-to-occur amplitude, and by the amplitude of the ending signal; and encode each identified amplitude event by at least one codeword such that for at least some identified amplitude events, relatively more likely-to-occur amplitude events are encoded by a shorter codeword than relatively less likely-to-occur amplitude events, such that relatively short codewords are formed to represent signal values or sequences of signal values that are relatively more likely-to-occur, and relatively long codewords are formed to represent signal values or sequences of signal values that are relatively less likely-to-occur.

23. An apparatus as recited in claim 22, wherein the series of digital signals is a series of quantized coefficients of a transformed block of image data formed by a transform such that the most likely-to-occur amplitude is 0, and the next most likely-to-occur amplitude is 1, such that the identifying of amplitude events identifies amplitude events that each includes a run of one or more non-zero-valued coefficients.

* * * * *